Feb. 5, 1924.
P. LIEFFRING
1,482,691
APPARATUS FOR FEEDING HOGS
Filed July 5, 1923 2 Sheets-Sheet 1
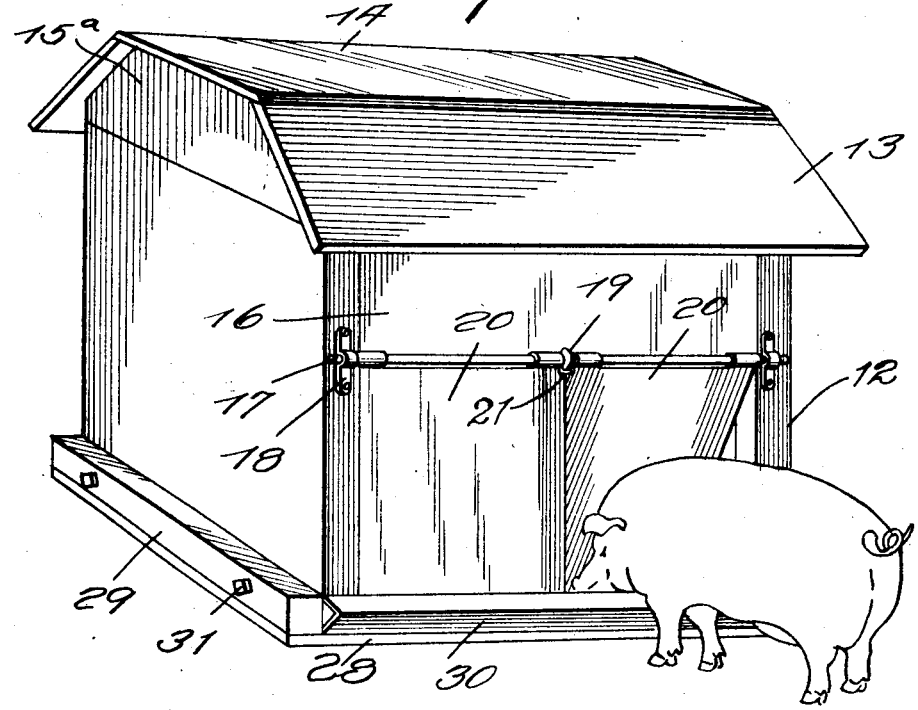
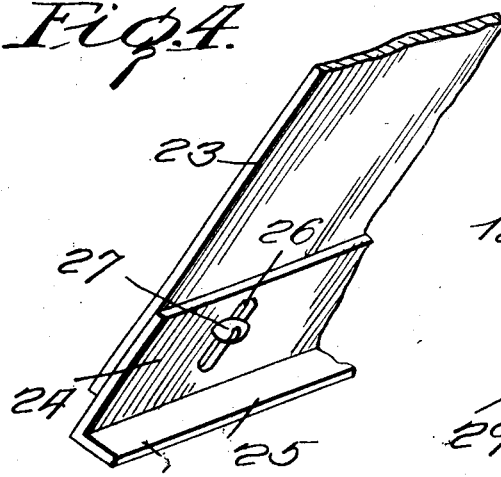
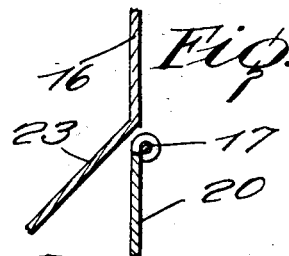
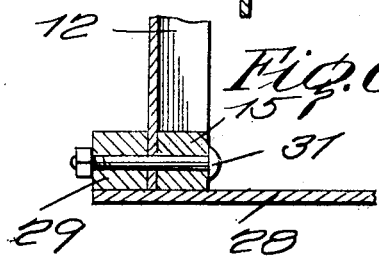
Inventor
Peter Lieffring
Watson E. Coleman
Attorney Feb. 5, 1924.
P. LIEFFRING
APPARATUS FOR FEEDING HOGS
Filed July 5, 1923
1,482,691
2 Sheets-Sheet 2
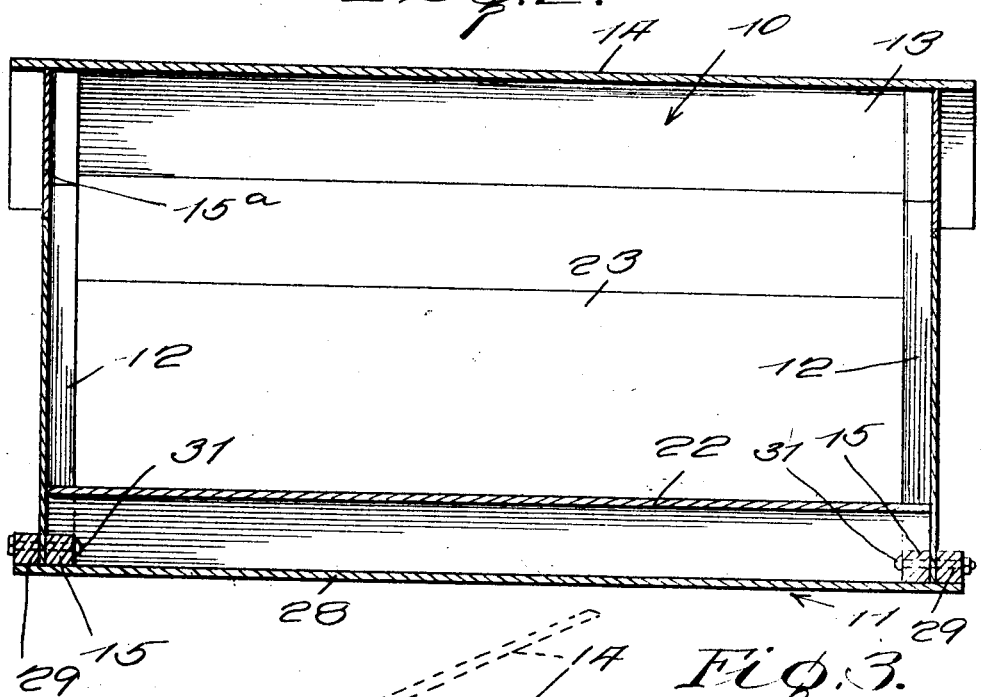
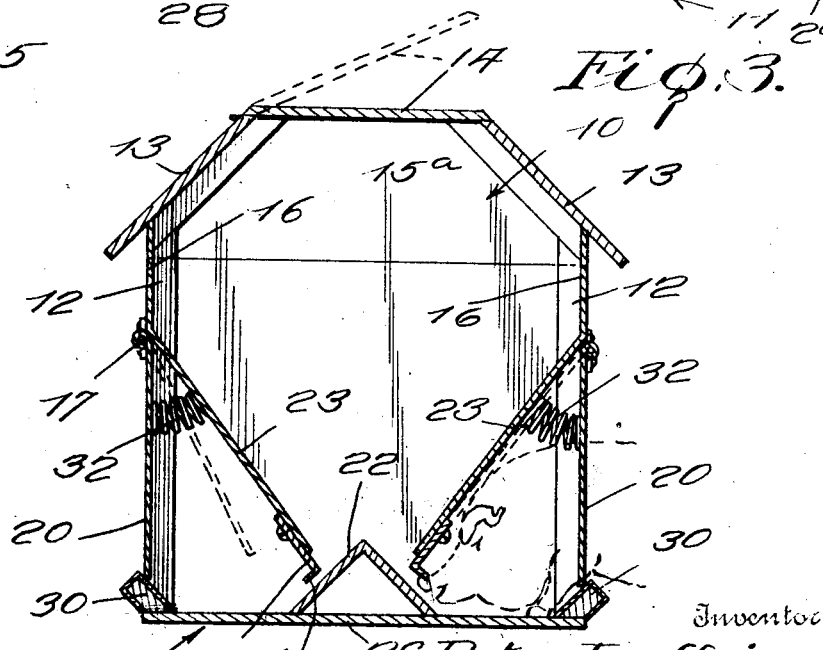

Patented Feb. 5, 1924.

1,482,691

UNITED STATES PATENT OFFICE.

PETER LIEFFRING, OF WATHENA, KANSAS.

APPARATUS FOR FEEDING HOGS.

Application filed July 5, 1923. Serial No. 649,607.

*To all whom it may concern:*

Be it known that I, PETER LIEFFRING, a citizen of the United States, residing at Wathena, in the county of Doniphan and State of Kansas, have invented certain new and useful Improvements in Apparatus for Feeding Hogs, of which the following is a specification, reference being had to the accompanying drawings.

This invention relates to apparatus for feeding hogs and more particularly to hog feeding apparatus wherein the food is accessible to the animals at all times.

An important object of the invention is to provide a device of this character having a feed regulator so constructed that rooting of the feed from the supply trough to the feeding trough is prevented thus eliminating a great deal of waste.

A further object of the invention is to provide a device of this character which may be simply and cheaply produced, readily operated and which will be efficient and durable in service.

These and other objects I attain by the construction shown in the accompanying drawings wherein for the purpose of illustration is shown a preferred embodiment of my invention and wherein:—

Figure 1 is a perspective view of feeding apparatus constructed in accordance with my invention;

Figure 2 is a longitudinal sectional view therethrough;

Figure 3 is a transverse sectional view therethrough;

Figure 4 is a detail perspective showing the mounting and construction of the feed regulator;

Figure 5 is a detail sectional view showing the mounting of the door; and

Figure 6 is a sectional view showing the manner of attaching the storage compartment to the base.

The feeder comprises two sections, an upper or storage section 10 and a lower or base section 11. The storage section consists of a frame work including vertical uprights 12 arranged at the corners thereof and connected at their upper ends to a roof structure 13 having a central portion 14 which is hinged for a purpose presently to appear. At the ends of the storage section the lower ends of the vertical supports 12 are connected by a transverse member 15 and the ends of the storage sections are sheathed with metal, as indicated at 15ª. The sides of the storage section are sheathed at their upper portions, as indicated at 16, and immediately below this sheathing are provided with a shaft 17 which passes through bearings 18 carried by the vertical members 12 and an eye or eyes 19 carried by the sheathing 16. Between the supports of the shaft doors 20 are secured to the shaft and depend therefrom, these doors being notched at their upper ends to accommodate the eye, as indicated at 21, so that their adjacent edges will closely approximate one another and prevent the formation of spaces therebetween.

Between the transverse members 15 extends an inverted V-shaped bevel member 22, the edges of which are arranged in the plane of the lower surface of the transverse members. Secured to the vertical members 12 are hopper walls 23 extending from the sheathing 16 of the sides downwardly toward the side face of the adjacent arm of the V-shaped bevel 22. The space between the edge of the plate and the adjacent surface of the bevel representing a maximum feed opening, these hopper walls extend from end to end of the storage section. The numerals 24 designate feed regulators, one for each hopper wall, each comprising a plate slidably abutting the hopper wall adjacent its lower edge, such plates being provided upon their lower edges with an outwardly directed flange 25. The feed regulators 24 have formed therethrough transversely extending slots 26 through which are directed securing elements 27 carried by the hopper walls 23. The slots permit adjustment of the flanges toward the lower edge of the feed regulator plates toward and away from the adjacent face of the bevel 22 and the securing elements 27 serve to hold the feed regulator in adjusted position.

The base section consists of a flat platform 28 of greater length and width than the storage section at the bottom thereof, which platform is provided upon its upper surface at each end with a transverse member 29 and along its edges with longitudinally extending members 30. The members 29 are adapted for the reception of securing elements 31 extending therethrough and through the transverse members 15, so that the upper or storage section may be secured to the base. The sections 14 provide an abutment limiting outward movement of the doors and are preferably covered with metal to prevent destruction thereof. In the storage section between the doors 20 and the adjacent faces of the hopper walls 23 compression springs 32 extend which serve to force the doors outwardly and maintain them in engagement with the longitudinal members 30. In the use of the device the doors are forced inwardly by the hogs to afford access to the trough formed by the adjacent edge of the bevel 22 and the strips 14. The food contained within the hopper will be fed down between the edge of the regulator plate and the bevel to replace food removed from the trough. It is pointed out that hogs will root about in a trough and unless the quantity of the food which may be delivered to the trough be limited will waste large quantities of the food. It is for this reason that I have applied the flange 25 to the feed regulators 24. It is well known to those familiar with these animals, hogs have upon their snouts a flange of cartilage which is employed in rooting. This flange will by-pass an ordinary adjustable regulator and distribute the contents of the bin permitting the same to flow rapidly to the troughs from which the hogs are feeding. By the use of the flange the hog is prevented from introducing this cartilage and rooting in the hopper proper and must therefore confine himself to the feed contained within the trough. The use of the springs to force the doors to the closed position have been found extremely advisable due to the habit of hogs of scattering their feed while eating, for particles of food will often lodge in such position as to prevent proper action of a gravity operated door and permit access to the hopper to be had by poultry. It will, of course, be understood that the construction hereinbefore set forth is capable of a certain amount of change and modification without in any manner departing from the spirit of my invention and I accordingly do not limit myself to such specific structure except as hereinafter claimed.

I claim:—

In hog feeding apparatus, a storage compartment comprising side and end walls, side walls terminating in spaced relation to the bottom of the compartment, hopper walls inclining inwardly from the side walls, a V-shaped baffle carried by the end walls and toward which said inclined hopper walls are directed, feed regulators carried by said hopper walls and adjustable toward and away from said baffle, said plate being provided at its lower end with an angular flange directed away from said hopper.

In testimony whereof I hereunto affix my signature.

PETER LIEFFRING.